May 26, 1931.  L. J. L. RECTOR  1,807,550
INSECT TRAP
Filed May 2, 1930  2 Sheets-Sheet 1
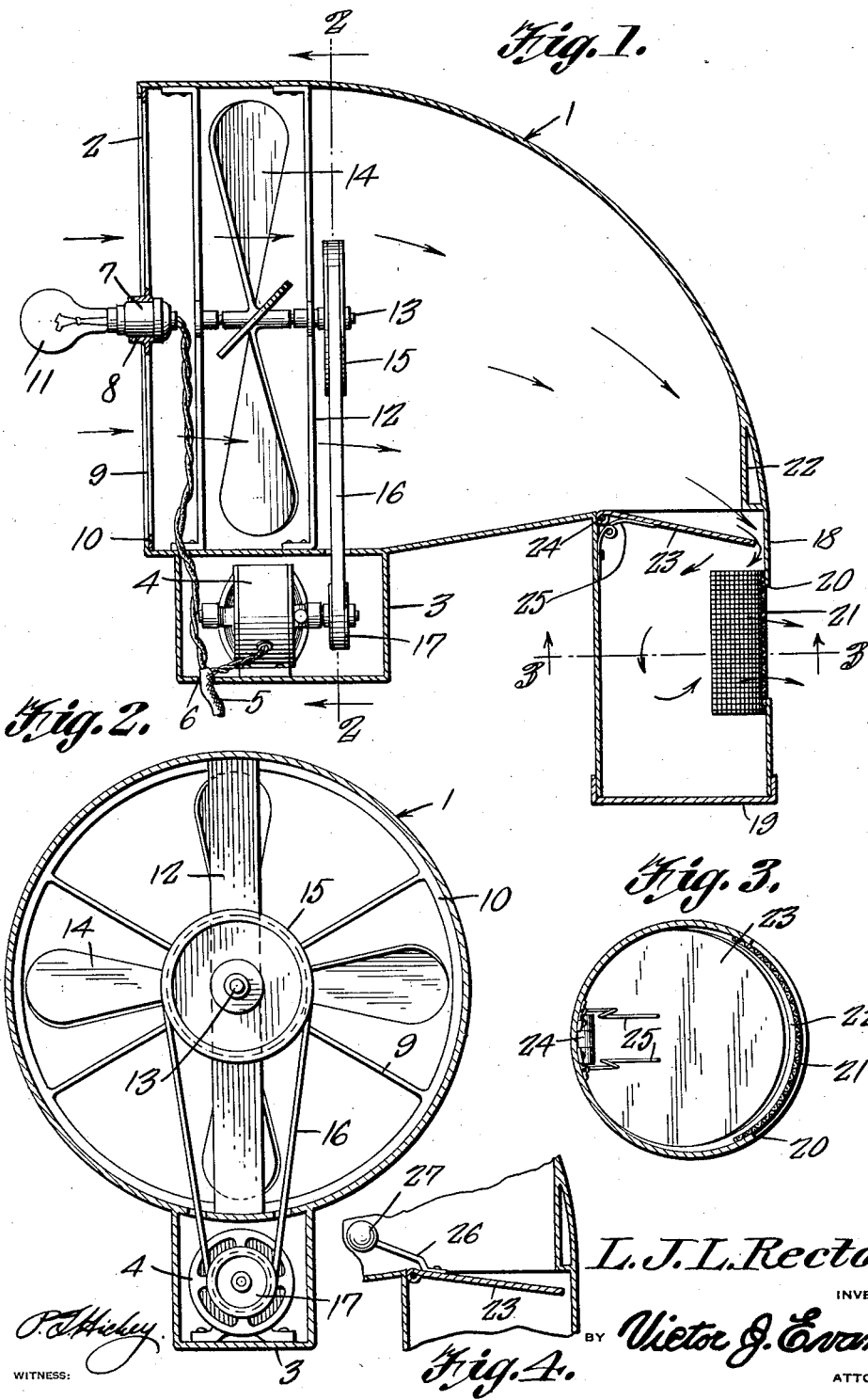
L. J. L. Rector,
INVENTOR
BY Victor J. Evans
ATTORNEY May 26, 1931. L. J. L. RECTOR 1,807,550
INSECT TRAP
Filed May 2, 1930 2 Sheets-Sheet 2
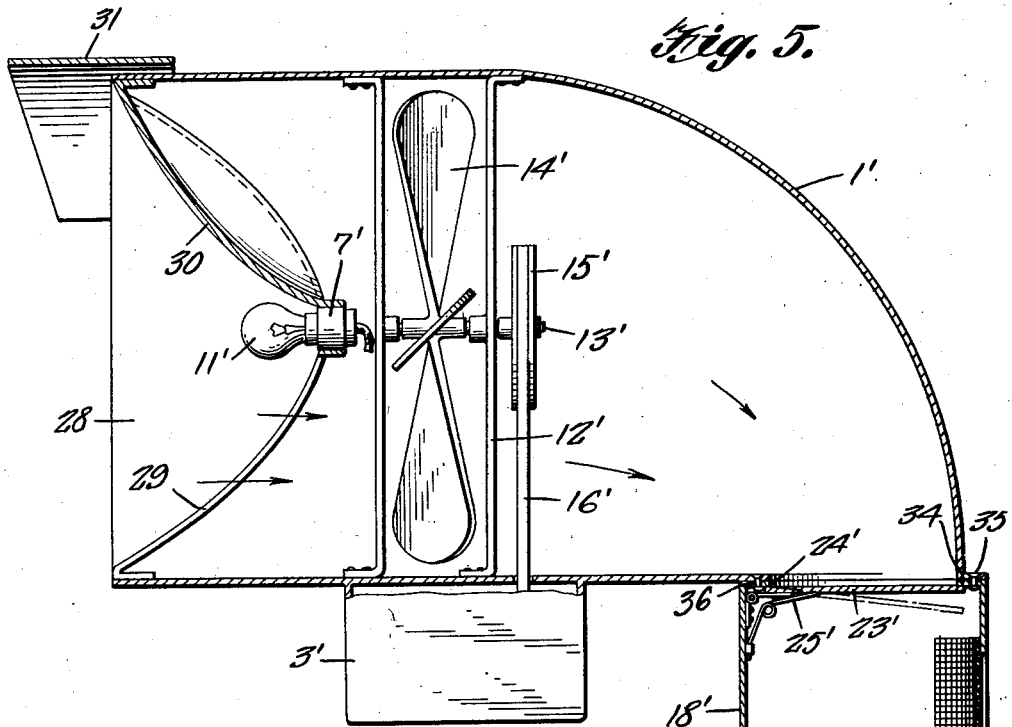
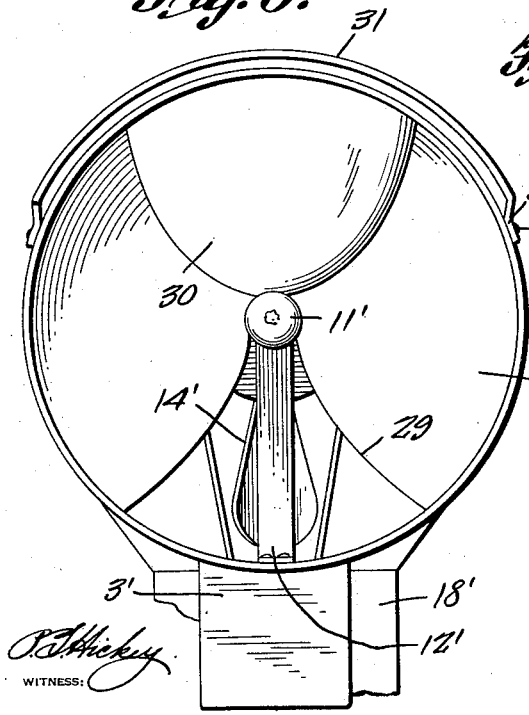
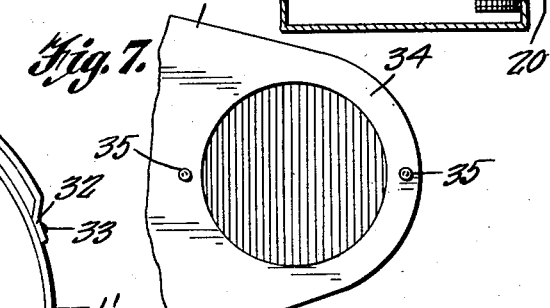
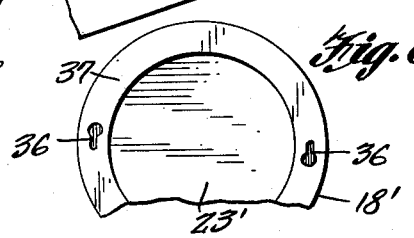
L. J. L. Rector, INVENTOR Patented May 26, 1931

1,807,550

UNITED STATES PATENT OFFICE

LOUIS J. L. RECTOR, OF AMISSVILLE, VIRGINIA

INSECT TRAP

Application filed May 2, 1930. Serial No. 449,270.

This invention relates to insect traps and has as its primary object to provide a trap which will, during night hours, attract insects and collect the trapped insects in a compartment from which they will be unable to escape.

Another object of the invention is to provide an insect trap which may be operated by an ordinary electric fan arranged to create a suction through a casing, in combination with a source of illumination arranged in advance of the fan, so that insects attracted by the light rays from the source of illumination, will be drawn into the casing and delivered into a trapping compartment.

Another object of the invention is to so construct the trapping compartment that it will embody means to provide for the escape of air currents which are drawn into the casing by the fan in a manner to carry with them the insects which are drawn into the mouth or open end of the casing and, in this connection, the invention also has as its object to provide means for closing said compartment, automatically, when the current to the fan is cut off, so that, at such time, the insects cannot fly or crawl from the compartment and escape.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 1 is a vertical front to rear sectional view through the trap embodying the invention.

Figure 2 is a vertical transverse sectional view taken substantially on the line 2—2 of Figure 1 looking in the direction indicated by the arrows.

Figure 3 is a horizontal sectional view on the line 3—3 of Figure 1 looking in the direction indicated by the arrows.

Figure 4 is a vertical section illustrating a modification.

Figure 5 is a view similar to Figure 1 illustrating a modification.

Figure 6 is a front elevation of the embodiment shown in Figure 5.

Figure 7 is a bottom plan view of the delivery spout of the casing.

Figure 8 is a top plan view of the trapping compartment.

The trap embodying the invention comprises a casing which is indicated in general by the numeral 1 and which is preferably formed of sheet metal, and this casing is open at one end as indicated by the numeral 2 and at its said end is substantially cylindrical in form but, from it cylindrical portion to its rear end, is tapered so as to be of approximately conical form and the upper side of this portion of the casing is curved downwardly so that currents of air drawn into the casing through the mouth thereof will be directed downwardly as they issue from the rear end of the casing. A compartment indicated by the numeral 3 is located upon the under side of the cylindrical portion of the casing 1 and an electric motor 4 is mounted in this compartment and supplied with current by conductor wires 5 leading through an opening 6 in the bottom of the compartment. The conductor wires also lead to a light bulb socket 7 which is mounted in a collar 8 provided at the center of a spider including slender arms 9 which radiate from the collar 8 and a rim 10 which is of annular form and to which the outer ends of the arms 9 are united. The socket 7 is preferably horizontally disposed and the bulb 11 which is fitted therein is therefore supported in position extending horizontally, axially beyond the open end of the casing.

Mounted within the cylindrical forward portion of the casing is a frame structure 12 in which is mounted a shaft 13 supporting a fan 14, the blades of which are so positioned that when the fan is rotated through power applied to the shaft 13, air will be drawn by suction into the casing through the open front thereof. A pulley 15 is fixed upon the end of the shaft 13 and a belt 16 is trained about this pulley and about a pulley 17 which is fixed upon the shaft of the electric motor 4, it being understood that house current may be employed for supplying current to the motor both to effect rotation of the fan and to energize the light bulb 11.

The rear end of the casing 1 is so formed that it is substantially open and of circular contour, and a trapping compartment 18 of cylindrical form is formed or secured at its upper end at the opening and extends vertically downwardly from the said end of the compartment. The compartment 18 is open at its lower end and a closure cap 19 is fitted thereto and may be removed when it is desired to discharge the insects, which have been trapped, from the compartment. The compartment is provided in its rear side with an opening 20 which extends part way around the wall of the compartment, and a screen 21 of wire mesh or any other foraminous material is arranged within this opening so as to provide for the free flow of air current through the opening and at the same time prevent even the smallest insects leaving the compartment, through the opening.

In order that the air currents delivered from the fan 14 may be delivered into the compartment 18 in the most effective manner and likewise in order that the compartment may be completely closed at its upper end when the fan is not in operation, a baffle 22 is mounted upon the inner side of the wall of the casing 1 immediately above the open top of the compartment 18 and therefore at the rear side of said compartment, and the wall of this baffle is preferably vertically disposed so that air currents striking the same will be deflected somewhat in a downward direction, this change in direction of flow of the air currents being also produced by reason of the downward curvature of the upper side of the wall of the casing 1. A baffle plate 23 which is of circular form is hingedly mounted as at 24 at its forward side in the open top of the compartment and this plate is of a diameter to substantially fit snugly within the open top of the compartment when the plate is in full raised position. In order that the plate may be closed except when the fan is in operation, and also in order that it may be automatically movable to lowered position when a draft of air currents is created by the fan, a spring 25 is mounted upon the forward wall of the compartment and coiled between these ends and bears at its other or upper end against the under side of the baffle plate as shown in Figures 1 and 3 of the drawings.

If desired, instead of using a spring such as the spring 25, an arm 26 may be extended from the plate 23 and a weight 27 may be provided upon the free end of this arm.

In the embodiment of the invention shown in Figures 5 to 8 inclusive, parts corresponding to the parts shown in Figures 1 to 4 inclusive, are indicated by the same reference numerals, primed, and, in this embodiment of the invention the fan 14' is spaced inwardly from the forward end of the casing 1 as is also the light bulb socket 7' and the light bulb 11' fitted therein.

This embodiment of the invention contemplates the employment of a unique assemblage of reflectors in connection with the source of illumination, to render the apparatus more effective than one in which the reflectors are not present, in view of the fact that it is the rays of light which attract the insects into the apparatus to a point where they will be drawn in by the suction of the fan, and therefore the arrangement of reflectors in this embodiment of the invention will serve the purpose stated and, as shown in Figures 5 and 6 of the drawings the reflector assemblage embodies the reflectors 28 which are arranged at the opposite sides of the source of illumination and each of which reflectors has the form of a segment of a hollow conoid, the reflectors being arranged with their concave sides presented in the path of the rays of light from the bulb 11' and the lower edges of these reflectors are curved downwardly and forwardly as shown in said figures so as to provide a space 29 through which a current of air will be created.

The assemblage embodies another reflector 30 and this reflector also has the form of a segment of a hollow conoid but differs from the reflectors 28 in that, whereas, in the instance of the reflectors 28, the concave surfaces of the reflectors are the reflecting surfaces, in the instance of the reflector 30 it is the convex face which constitutes the reflecting surface, and as will be evident by reference to the said Figures 5 and 6, this reflector 30 is positioned between the upper margins of the reflectors 28. It will be evident from the foregoing that the reflection of light rays by the peculiar arrangement of reflectors will greatly enhance the effectiveness of these rays in attracting insects, and the insects will therefore be more readily induced to enter the trap than if these reflectors were not present. Another advantage which this embodiment of the invention presents is that, by providing the reflector assemblage, above described, and by having the lower margins of the reflector 28 spaced with respect to each other, to provide the space 29, insects which might fail to enter the casing, or those which strike the reflectors with an impact to cause them to fall, will fall into the forward portion of the casing through the space 29 and be blown by the fan into the casing and delivered into the trapping compartment 18'. Furthermore, by reason of this arrangement of reflectors, it is permissible to position the source of illumination a considerable distance inwardly of the open end of the casing and insects will therefore have a tendency to fly into the casing rather than past the same.

In order to protect the reflectors and likewise provide for the projection of other reflected light rays, a hood 31 is provided and is mounted by offset terminal portions 32 and rivets or other securing elements 33 above and in spaced relation to the upper side of the casing 1' at the open end thereof and the under side of the hood is finished or coated to afford a suitable reflecting surface.

In the embodiment of the invention first described, the trapping compartment 11' is provided with a removable cap in its bottom and, in view of the fact, in this embodiment when the cap is removed, some of the insects may still be alive and escape, the invention in the embodiment shown in Figures 5, 7 and 8 is adapted to provide against any escape of the insects by means which will now be described. This means comprises a flange 34 which extends about the open delivery end of the casing 11 and headed studs 35 are mounted upon this flange at suitable intervals and key hole slots 36 are formed in the flange 37 which projects inwardly from the circumferential wall of the compartment 18', the flanged top of the said compartment being fitted against the flange 34 with the heads of the studs 35 entering the larger end of the slots 36 and the compartment is then rotated a short distance so as to interlock the parts, and it will now be evident that inasmuch as the baffle plate 23' is automatically closed when the fan is not in operation, the said baffle plate will be maintained in its closed position by the spring 25' and therefore the compartment will be completely closed.

What I claim is:—

1. An insect trap comprising a casing having an open end and tapered from said end toward its other end, a source of illumination at the first mentioned end of the casing, a suction fan in the casing in rear of the source of illumination to attract insects, a trapping compartment at the last mentioned end of the casing, the source of illumination being spaced inwardly from the open end of the casing, and a reflector assemblage within the casing between the fan and the open end of the casing, the said assemblage comprising two reflectors arranged at opposite sides of the source of illumination, each reflector having the form of a segment of a hollow conoid, the concave sides of the reflectors being presented in the path of rays from the source of illumination and the lower edges being curved downwardly and in opposite directions to provide a space for the entry of insects into the casing, and another reflector also having the form of a segment of a hollow conoid and arranged between the first mentioned reflectors and having its convex side presented in the path of rays from the source of illumination and toward the space between the first mentioned reflectors.

2. An insect trap comprising a casing having an open end and tapered from said end toward its other end, a source of illumination at the first mentioned end of the casing, a suction fan in the casing in rear of the source of illumination to attract insects, a trapping compartment at the last mentioned end of the casing, and a baffle mounted in the compartment at the upper portion thereof, means normally holding the baffle closed, the baffle being adapted to open under the blast from the fan when the fan is in operation, and means separably connecting the said compartment with the last mentioned end of the casing, the said compartment having an inwardly projecting circumferential flange at its open top against which the marginal portion of the baffle is to seat.

In testimony whereof I affix my signature.

LOUIS J. L. RECTOR.